(12) United States Patent
Gebert

(10) Patent No.: US 9,114,702 B2
(45) Date of Patent: Aug. 25, 2015

(54) FUEL TANK FOR A MOTOR VEHICLE

(75) Inventor: Klaus Gebert, Willich (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 167 days.

(21) Appl. No.: 13/502,300

(22) PCT Filed: Oct. 9, 2010

(86) PCT No.: PCT/EP2010/006176
§ 371 (c)(1),
(2), (4) Date: Apr. 16, 2012

(87) PCT Pub. No.: WO2011/045007
PCT Pub. Date: Apr. 21, 2011

(65) Prior Publication Data
US 2012/0204984 A1    Aug. 16, 2012

(30) Foreign Application Priority Data
Oct. 16, 2009   (DE) .......................... 10 2009 049 799

(51) Int. Cl.
*F17D 3/00*   (2006.01)
*F02M 37/04*  (2006.01)
(Continued)

(52) U.S. Cl.
CPC ..... *B60K 15/077* (2013.01); *B60K 2015/03105* (2013.01); *B60K 2015/03111* (2013.01);
(Continued)

(58) Field of Classification Search
CPC .................. B60K 15/077; B60K 2015/03105; B60K 2015/03509; B60K 2015/03138; B60K 2015/03217; B60K 2015/03111; B60K 15/03504; B60K 2015/03118; F02M 37/106; F02M 37/0094; F02M 37/025

USPC ........... 137/565.22, 574, 125, 143, 192, 135, 137/131, 136, 137, 138, 139, 565.34; 123/514, 516
See application file for complete search history.

(56) References Cited

U.S. PATENT DOCUMENTS 3,810,714 A * 5/1974 Turner ............................. 417/80
4,951,699 A * 8/1990 Lipman ......................... 137/571
(Continued)

FOREIGN PATENT DOCUMENTS

CN          1244902 A      2/2000
DE          20019968 U1    3/2001
(Continued)

OTHER PUBLICATIONS

International Preliminary Report on Patentability mailed May 8, 2012 with English translation of PCT Written Opinion, received in corresponding PCT Application No. PCT/EP2010/006176, 11 pgs.
(Continued)

*Primary Examiner* — Craig Schneider
*Assistant Examiner* — Craig J Price
(74) *Attorney, Agent, or Firm* — Grossman Tucker Perreault & Pfleger, PLLC

(57) ABSTRACT

A fuel tank for a motor vehicle, comprising at least one fuel delivery pump arranged in the fuel tank inside a surge tank provided therein, at least one suction jet pump fed from the feed of the fuel delivery pump for filling the surge tank or for draining at least one further volume arranged inside the fuel tank or formed by the fuel tank into the surge tank or into the volume of the fuel tank in which the surge tank is arranged. The fuel tank according to the invention is characterized in that at least one suction jet pump is connected, in that it takes fuel alternately, depending on the tank fill level, from several volumes arranged or formed inside the fuel tank or it can be operated intermittently depending on the tank fill level.

10 Claims, 3 Drawing Sheets

Figure 4:
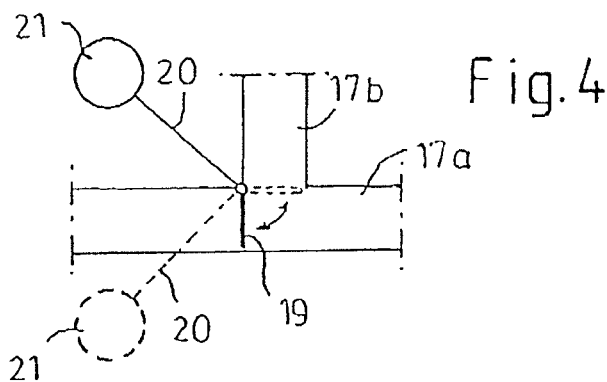

(51) Int. Cl.
*B60K 15/077* (2006.01)
*B60K 15/03* (2006.01)
*B60K 15/035* (2006.01)

(52) U.S. Cl.
CPC ............... *B60K2015/03138* (2013.01); *B60K 2015/03217* (2013.01); *B60K 2015/03509* (2013.01); *Y10T 137/85978* (2015.04)

(56) References Cited

U.S. PATENT DOCUMENTS

| | | | |
|---|---|---|---|
| 5,040,516 A * | 8/1991 | Haraguchi | 137/565.22 |
| 5,743,239 A | 4/1998 | Iwase | |
| 5,749,345 A * | 5/1998 | Treml | 123/514 |
| 5,791,317 A * | 8/1998 | Eck | 123/514 |
| 5,797,373 A * | 8/1998 | Kleppner et al. | 137/574 |
| 5,941,279 A * | 8/1999 | Frank et al. | 137/574 |
| 5,979,485 A * | 11/1999 | Tuckey et al. | 137/574 |
| 6,276,342 B1 * | 8/2001 | Sinz et al. | 123/514 |
| 6,371,153 B1 * | 4/2002 | Fischerkeller et al. | 137/565.22 |
| 6,425,378 B1 * | 7/2002 | Frank | 123/509 |
| 6,505,644 B2 * | 1/2003 | Coha et al. | 137/565.22 |
| 6,607,005 B2 * | 8/2003 | Viebahn et al. | 137/574 |
| 6,792,966 B2 * | 9/2004 | Harvey | 123/514 |
| 6,810,908 B2 * | 11/2004 | Eck et al. | 137/565.22 |
| 6,863,084 B2 * | 3/2005 | Aschoff | 137/565.22 |
| 6,871,640 B2 * | 3/2005 | Atwood et al. | 137/574 |
| 6,907,899 B2 * | 6/2005 | Yu et al. | 137/565.22 |
| 6,955,158 B2 * | 10/2005 | Rumpf | 137/565.22 |
| 7,017,557 B2 * | 3/2006 | Rumpf | 123/516 |
| 7,021,295 B2 * | 4/2006 | Aschoff et al. | 123/514 |
| 7,082,931 B2 * | 8/2006 | Sinz | 123/514 |
| 7,219,704 B2 | 5/2007 | Bolle et al. | |
| 7,234,451 B2 * | 6/2007 | Betz et al. | 137/565.33 |
| 7,370,640 B2 | 5/2008 | Dickenscheid | |
| 7,383,822 B2 * | 6/2008 | Ramamurthy et al. | 123/514 |
| 7,634,987 B2 | 12/2009 | Gebert et al. | |
| 7,861,695 B2 | 1/2011 | Althof et al. | |
| 7,886,722 B2 | 2/2011 | Gebert et al. | |
| 7,913,670 B2 * | 3/2011 | Holtz | 123/509 |
| 8,678,226 B2 * | 3/2014 | Eulitz | 123/514 |
| 8,739,821 B2 * | 6/2014 | Murabayashi et al. | 137/565.22 |
| 2005/0039728 A1 * | 2/2005 | Krogull et al. | 123/516 |
| 2005/0051141 A1 | 3/2005 | Rumpf | |
| 2005/0241621 A1 * | 11/2005 | Kieninger et al. | 123/509 |
| 2008/0142097 A1 | 6/2008 | Rumpf | |
| 2008/0251523 A1 | 10/2008 | Krogull et al. | |
| 2008/0302339 A1 * | 12/2008 | Krogull et al. | 137/87.01 |
| 2009/0206097 A1 | 8/2009 | Gebert et al. | |

FOREIGN PATENT DOCUMENTS

| | | |
|---|---|---|
| DE | 10335243 A1 | 3/2005 |
| DE | 102007039861 A1 | 2/2009 |

OTHER PUBLICATIONS

PCT International Search Report mailed May 24, 2011, received in corresponding PCT Application No. PCT/EP2010/006176, 4 pgs, in English language.

English translation of Japanese Notification of Reasons for Refusal mailed Sep. 10, 2013, received in corresponding Japanese Patent Application No. 2012-533515, 4 pgs.

English translation of Chinese Search Report issued Apr. 18, 2014, received in related Chinese Patent Application No. 201080046446.8, 2 pgs.

* cited by examiner

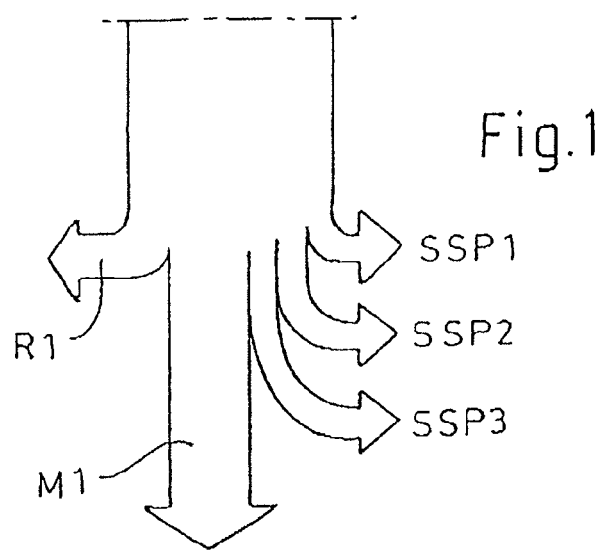
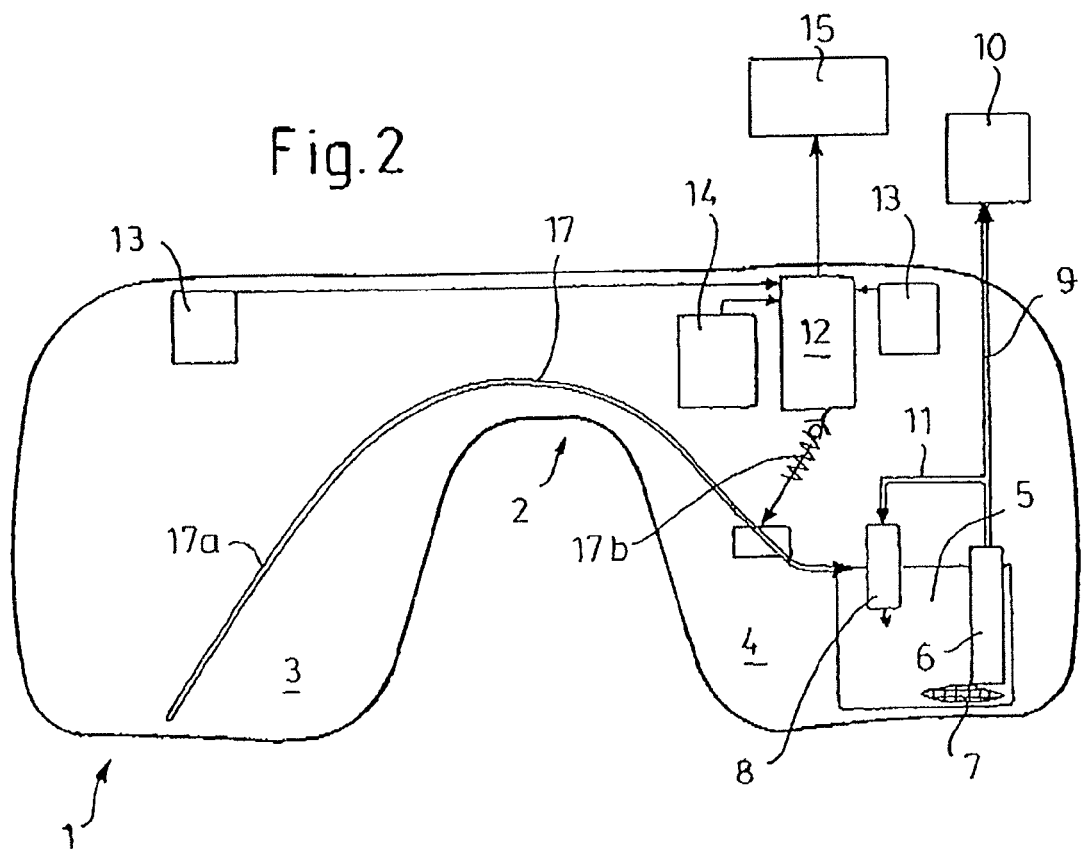

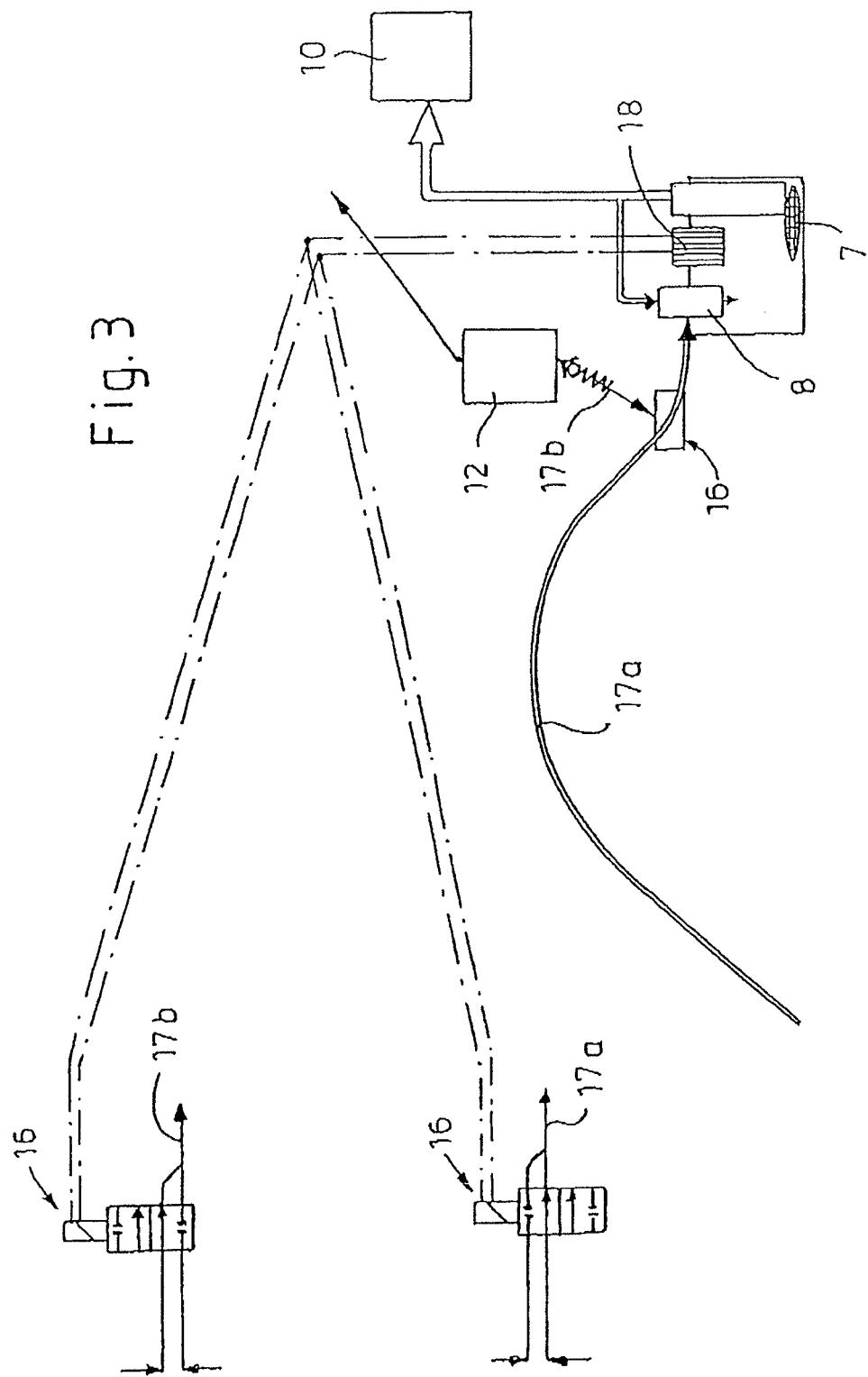

FUEL TANK FOR A MOTOR VEHICLE

The invention concerns a fuel tank for a motor vehicle with means for ventilation and purging and means for delivery of fuel to the combustion engine of a motor vehicle, comprising at least one fuel delivery pump arranged in the fuel tank, preferably inside a surge tank provided therein, at least one suction jet pump fed from the feed of the fuel delivery pump for filling at least one surge tank and/or for draining at least one further volume arranged inside the fuel tank and formed by the fuel tank into the surge tank or into the volume of the fuel tank in which the surge tank is arranged.

The invention furthermore concerns a method for operating a fuel supply device to the combustion engine of a motor vehicle, wherein the fuel supply device comprises at least one fuel tank for a motor vehicle with means for ventilation and purging, at least one fuel delivery pump arranged in the fuel tank inside a surge tank provided therein, at least one suction jet pump fed from the feed of the fuel delivery pump for filling the surge tank and/or for draining at least one second communicating fuel volume arranged or formed inside the fuel tank into the surge tank or into the volume within which the surge tank is arranged.

Such a fuel tank is known for example from EP 1 706 287 B1.

Suction jet pumps are generally used, in particular in geometrically complex shaped fuel tanks with various intercommunicating part volumes, to at least ensure a supply to the fuel pump arranged in only one part of the tank. Normally the fuel pump is integrated in a so-called delivery unit which comprises a surge tank. This surge tank serves primarily to at least ensure a supply to the fuel pump in the event of surging or sloshing movements of the fuel provoked by the driving dynamics, or to prevent the fuel necessary to supply the fuel pump from eddying around in the fuel tank. For this, the fuel is pumped by means of the suction jet pumps from other volumes of the fuel tank into the surge tank of the fuel delivery unit. From there, the fuel delivery pump takes over delivery of the fuel to the combustion engine of the vehicle. Normally, even with the simplest fuel tank geometry, at least one suction jet pump is necessary to deliver from the tank volume to the surge tank.

In more complex fuel tank geometries, for example in saddle tanks as are often used in cars, at least one further suction jet pump is arranged in a volume of the fuel tank which communicates with the other respective tank volume via the saddle (constriction of the fuel tank). Normally the delivery unit with the fuel pump situated therein is arranged only in one tank volume, while a suction jet pump is placed in the other tank volume.

Suction jet pumps normally function according to the Venturi principle and, for operation, require a drive jet of fuel which is taken from the fuel return and/or fuel feed of the combustion engine. Recently, demand-controlled fuel delivery pumps are often used in fuel delivery systems, wherein the delivery power of the fuel pump is regulated depending on the fuel demand of the combustion engine of the motor vehicle. In such systems the drive jet for one or more suction jet pumps must be taken from the feed. It is readily plausible that the drive quantity required must be delivered additionally by the fuel pump. Depending on the number and distribution of the suction jet pumps in the fuel tank, this leads to a total load on the electric pump which has a negative effect on the power consumption, the low voltage behavior and the delivery quantity available for the combustion engine.

This problem is already addressed in EP 1 706 287 B1 where, with the fuel delivery system configuration described above, the disadvantage has been found that the suction jet pump must be dimensioned in any case such that it delivers sufficient fuel even with a low delivery pressure of the fuel pump. This would, however, in most working situations lead to the suction jet pump receiving unnecessarily large quantities of fuel as propellant, which would require the use of a particularly powerful pump. EP 1 706 287 B1 therefore proposes to provide in the propellant line to the suction jet pump a pressure-dependent volume flow reduction valve which chokes the volume flow of fuel supplied to the suction jet pump as the delivery pressure of the fuel pump rises. In this way, in particular in demand-controlled delivery units, an unnecessary delivery of fuel to the suction jet pump is avoided.

This solution does not, however, suit more complex systems with several volumes to be drained. As the number of suction jet pumps in the tank increases, there is a progressive reduction in the fuel quantity available for the combustion engine so that finally the fuel pump must be dimensioned accordingly.

The invention is therefore based on the object of reducing further the drive quantity of fuel for the suction jet pumps which is provided for draining individual volumes provided in the tank.

This object is initially achieved by a fuel tank for a motor vehicle with means for ventilation and purging and with means for delivery of fuel to the combustion engine of a motor vehicle, comprising at least one fuel delivery pump arranged in the fuel tank inside a surge tank provided therein, at least one suction jet pump fed from the feed of the fuel delivery pump for filling the surge tank and/or for draining at least one further volume arranged inside the fuel tank or formed by the fuel tank into the surge tank or into the volume of the fuel tank in which the surge tank is arranged, wherein the fuel tank is characterized in that the suction jet pump is connected such that it takes fuel alternately, depending on the tank fill level, from several volumes arranged or formed inside the fuel tank or that it can be operated intermittently depending on the tank fill level. Preferably at least one second suction jet pump, also fed from the feed, is provided.

The invention is based on the concept that the full delivery capacity for fuel to be delivered within the tank is only required for part of the time so that it is not necessary to deliver this drive quantity continuously. It can be provided either that a suction jet pump takes fuel alternately from different volumes of the tank or that a suction jet pump, for example in a saddle tank, is switched on only when the tank fill level requires it.

The term "volume" in the sense of the invention means not necessarily only the fuel volume in the tank but rather that separate volumes, for example of the ventilation and purging system, can also be arranged inside the fuel tank from which fuel is also actively taken or delivered.

In a preferred variant of the invention, it is provided that at least one suction jet pump is connected via at least two suction lines to several volumes to be drained, wherein within the suction path is provided at least one valve which can be switched depending on the fill level and releases a suction line depending on the fill level. It can also be provided that this valve closes the other respective suction line, for example to prevent any gas drawn in leading to failure of the suction jet pump concerned.

In a suitable embodiment of the fuel tank according to the invention, it is provided that a suction jet pump be connected to at least one collection tank formed as a fluid trap of a tank ventilation and purging device. In particular for tank purging during operation of the motor vehicle or fuel tank, because of the driving dynamics normally significant quantities of hydrocarbons in liquid phase are also carried. This carried fuel is called "liquid carry-over". For this, normally drip tanks or collection tanks are arranged in purge paths, in which liquid hydrocarbons are deposited. With a relatively low fill level in the fuel tank, normally an automatic, i.e. gravity-induced, drainage of such collection tanks occurs into the fuel volume of the fuel tank. With a relatively high fill level in the fuel tank, such drainage is not normally possible so that in this case it is provided to drain the collection tank actively. For example, the suction side of a suction jet pump can be connected to the collection tank concerned for this purpose.

The invention is based on the concept that, to drain the collection tank concerned, a suction jet pump can be used which is normally used to drain another fuel volume of the fuel tank, since drainage of the collection tank is only required when the tank fill level is high and these suction jet pumps are not then normally required to drain the communicating fuel volume of the fuel tank.

The valve necessary for switching the suction jet pump can be switchable directly or indirectly via at least one fill level sensor arranged inside the fuel tank. For example, the valve can be activatable directly or indirectly via at least one fill level sensor arranged inside the collection tank, wherein the collection tank is formed such that, in the case of a low fill level in the fuel tank, this drains into the fuel tank under gravity activation. If the fill level inside the collection tank rises, which is only the case when the fuel level in the fuel tank is high, this float preferably activates a valve in the suction path of the suction jet pump so that this can drain the collection tank.

Alternatively, it can be provided that the valve can be activated directly via a float arranged inside the fuel tank. Such a variant comprises any configuration of volumes within the tank and any arrangement of suction jet pumps. It is particularly suitable if the valve can be activated electromagnetically via a fill level signal supplied by at least one fill level sensor.

The object on which the invention is based is furthermore achieved by a method for operating a fuel supply device to the combustion engine of a motor vehicle, wherein the fuel supply device comprises at least one fuel tank for a motor vehicle with means for ventilation and purging, at least one fuel delivery pump arranged in the fuel tank inside a surge tank provided therein, and at least one suction jet pump fed from the feed of the fuel delivery pump for filling the surge tank and/or for draining at least one second communicating fuel volume arranged or formed inside the fuel tank into the surge tank or into the volume within which the surge tank is arranged, wherein the method is characterized in that drainage of the second or a further fuel volume with a suction jet pump or where applicable a further suction jet pump takes place only when the tank fill level has fallen below a specific predetermined level.

In a variant of the method according to the invention, active drainage of the second or a further fuel volume takes place only when the fill level has fallen so far that the respective volumes of the fuel tank no longer necessarily intercommunicate.

Figure 5A:
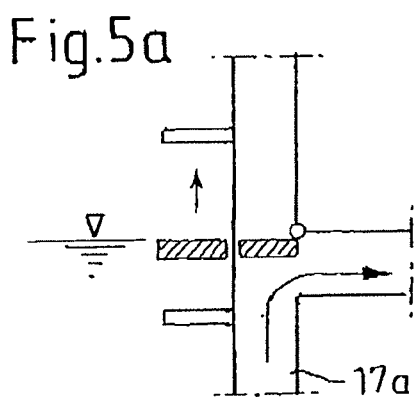
Figure 5B:
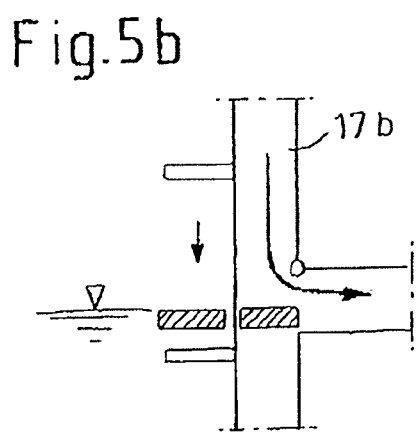
Figure 6A:
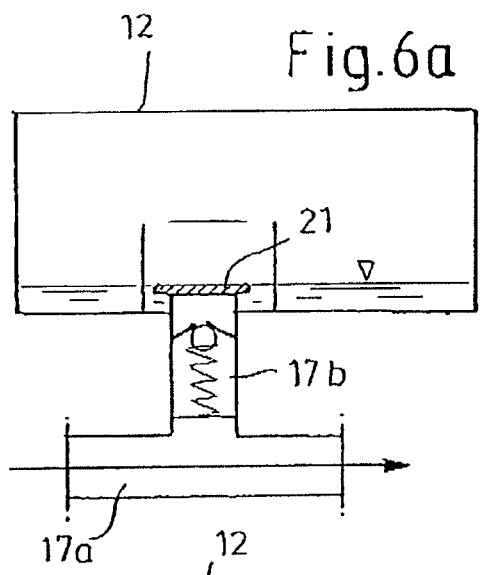
Figure 6B:
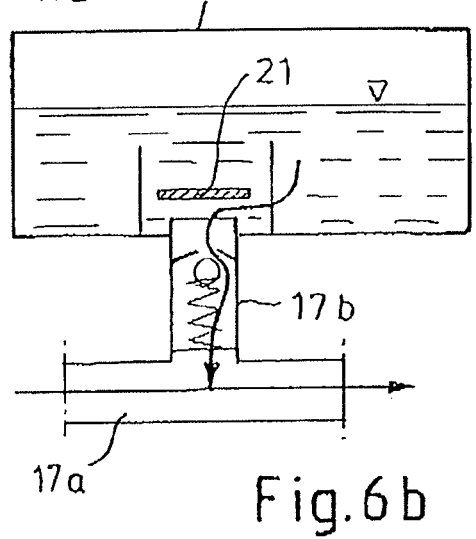

The invention is explained below with reference to an embodiment example shown in the drawings. These show:

FIG. 1 a schematic view of the distribution of the fuel flows in a fuel supply system of a fuel tank according to the prior art with several suction jet pumps, FIG. 2 a schematic view of a fuel tank according to the invention, shown greatly simplified and symbolically, FIG. 3 a simplified schematic view of the fuel supply system without fuel tank with circuit diagrams for certain functions, FIG. 4 a simplified view of a possible embodiment of a valve provided in the suction path of a suction jet pump according to the invention, FIGS. 5a, 5b an alternative embodiment of such a valve, FIGS. 6a, 6b a simplified schematic view of a collection tank connected to the suction path of a suction jet pump.

Reference is made first to FIG. 1 which shows graphically the fuel flows or fuel quantity which must be controlled by a fuel delivery pump. In a modern SUV (sports utility vehicle), the combustion engine in the full load range uses up to 60 l/h of fuel. The volume flow of fuel used by the combustion engine is designated $M_1$ in FIG. 1. The quantity of fuel required additionally for the controllability of the fuel pump is designated $R_1$ in FIG. 1. In addition, the fuel pump must provide the drive quantity of fuel necessary for the suction jet pumps, designated SSP1, SSP2 and SSP3 in FIG. 1. At a delivery pressure of around 4 bar, each of these part volume flows can amount to up to 15 l/h so that, with three suction jet pumps provided in the fuel tank, a drive volume of around 45 liters of fuel per hour alone is required.

According to the invention, it is provided to reduce this drive quantity such that either a suction jet pump takes fuel alternately from several volumes of the fuel tank or where applicable is operated intermittently, in fact depending on the fill level in the fuel tank 1 shown in FIG. 2. The fuel tank 1 shown in FIG. 1 is formed in the known manner as a plastic fuel tank for a car. In the embodiment example described, this is formed as a saddle tank with two fuel volumes 3, 4 separated by a constriction 2. The filling opening provided on the fuel tank 1 and other function components have been omitted from the figure for the sake of simplicity.

The fuel tank 1 furthermore comprises a surge tank 5 arranged in the right-hand fuel volume 4 in FIG. 2. The arrangement of the surge tank 5 is not critical for the invention. The surge tank 5 is part of a fuel delivery unit which comprises amongst others a fuel delivery pump 6 and at least one fill level sensor 7. The fill level sensor 7, as is not directly evident from the drawing, is hinged on the outside of the surge tank 5 and in the simplest case can be formed as a lever sensor with float body. The position of the fill level sensor 7 in the known manner generates an electrical signal which is passed to the vehicle electronics via corresponding electronic components (not shown). In the schematic view in FIG. 1, 8 designates a suction jet pump formed as a so-called sucking suction jet pump and working according to the Venturi principle. A suction jet is generated by a drive jet 11 branched from the fuel feed 9 to the combustion engine 10. On the suction side, the suction jet pump 8 is connected firstly to the fuel volume 3 which is arranged opposite the fuel volume 4 containing the fuel delivery unit, and secondly the suction jet pump 8 is connected to a collection tank 12 of a ventilation and purging device of the fuel tank 1. Alternatively, the suction jet pump 8 could be connected to several fuel volumes; for example the case is conceivable that the fuel tank 1 comprises more than two fuel-guiding and intercommunicating volumes.

The ventilation and purging device of the fuel tank 1 according to the invention is also shown greatly simplified and schematically in the drawing. This comprises for example two purge valves 13 and a fill level limiter valve 14. The purge valves 13 can equally also be formed as roll-over valves (roll-over protection valves). Both the purge valves 13 and the fill level limiter valve 14 communicate via corresponding purge lines with the collection tank 13 which in turn is connected to a fuel vapor filter 15 arranged outside the fuel tank 1. The collection tank serves to receive hydrocarbons in the liquid phase carried over during purging of the fuel tank 1. In particular in the event of surge movements of the fuel provoked by driving dynamics, significant quantities of hydrocarbon droplets are carried along in the gas flow which must not be delivered to the fuel vapor filter 15. The latter usually comprises one or more chambers filled with active charcoal, the adsorption capacity of which is reduced when moistened with liquid hydrocarbons.

In particular in the case of a high tank fill level, gravity-induced or gravity-activated drainage of the collection tank 2 is not guaranteed so that for this case, in the fuel tank 1 according to the embodiment example, an active drainage is provided via the suction jet pump 8.

It is pointed out here that at least one further suction jet pump is provided to deliver the fuel present in the tank volume 4 into the surge tank 5. This suction jet pump is not shown for reasons of simplicity.

The suction jet pump 8 is fitted with a suction line 17a, b branched via a valve 16. Part of the suction line 17a is guided into the fuel volume 3 and the other part of the suction line 17b is connected to the collection tank 12.

The valve 16 is shown only relatively schematically in FIG. 2. FIG. 3 shows the fuel delivery system without the fuel tank 1 with the valve-switching functions in the form of hydraulic circuit diagrams. The valve is formed as an electromagnetically activatable 2/2 way valve, wherein the top view in FIG. 3 shows the switch position of the valve with a high tank fill level, and the lower view in FIG. 3 shows the switch position of the valve with a low tank fill level. In the case of a low tank fill level, the suction path or suction line 17a to the fuel volume 3 is clear, while the suction line 17b connected to the collection tank 12 is blocked, so that only fuel from the fuel volume 3 can be taken by means of the suction jet pump 8 and delivered into the surge tank 5.

In the view shown in the upper part of FIG. 3, the suction line 17b to the collection tank 12 is clear while the other valve path is blocked.

A flutter valve also provided in the collection tank, which allows a gravity-activated drainage of the collection tank at a low tank fill level, has not been shown for reasons of simplicity.

The electrical signal to activate the valve 16 is generated via a control unit 18, depicted merely schematically, in the fuel delivery unit. The signal generated by the control unit 18 is triggered by the fill level sensor 7.

An alternative, relatively simple variant of controlling the valve 16 is shown in FIG. 4. FIG. 4 shows a line branch of the suction line 17a, 17b in which a lever-activated closing flap 19 is arranged as a valve. The closing flap is connected via an activating lever 20 to a float body 21 which, in the floated-up state, i.e. in the case of a high tank fill level, moves the closing flap 19 into the position shown in solid lines in which the suction line 17a is closed and the part of the suction line 17b to the collection tank 12 is opened.

Another variant of the design and activation of the valve 16 is shown in FIGS. 5a and 5b. There, the same components carry the same reference numerals. The closing flap 19 comprises a magnetizable material and cooperates magnetically with a ferromagnetic float body 21 which, when floated up (FIG. 5a), moves the closing flaps 19 into a position releasing the suction line 17a and, when the fill level falls (FIG. 5b), releases the suction line 17b and at the same time closes the suction line 17a.

A further variant of the switching of the valve 16 is shown in FIGS. 6a and 6b. There, the suction line 17b connected to the collection tank 12 is closed with a float body 21 arranged inside the collection tank 12. In addition, a spring-loaded non-return valve 22 is provided in the suction line 17b. This is to be provided in each case inside the part 17b of the suction line.

FIG. 6a shows the state of the collection tank 12 at low fill level inside the collection tank, which is equivalent to a low fill level in the fuel tank 1. In this state, in principle a gravity-activated drainage of the collection tank 12 is possible via a further opening (not shown), which is closed with a valve, of the collection tank 12. The fill level of the fuel tank has usually here fallen so far that the fuel volumes 3 and 4 no longer intercommunicate. The float body 21 closes the suction line 12b, the suction jet pump 8 draws fuel from the fuel volume 3 only via the suction line 17a.

FIG. 6b shows the state in which the float body 21 has floated up inside the collection tank 12 due to the rising fluid level there. The suction line 17b is released. The suction line 17a, however, is not blocked, which in this embodiment example is harmless insofar as the fuel volume 3a is filled with fuel and thus there is no risk of gas being drawn in.

In the embodiment examples described above, by the corresponding switching of the suction jet pump 8 concerned via the valve 16, a further or separate suction jet pump or several suction jet pumps are not required for draining the collection tank 12 or further volumes provided in the fuel tank 1.

LIST OF REFERENCE NUMERALS

1 Fuel tank
2 Constriction
3, 4 Fuel volumes
5 Surge tank
6 Fuel delivery pump
7 Fill level sensor
8 Suction jet pump
9 Fuel feed
10 Combustion engine
11 Drive jet
12 Collection tank
13 Purge valve
14 Fill level limiter valve
15 Fuel vapor filter
16 Valve
17a, b Suction line
18 Control unit
19 Closing flap
20 Activating lever
21 Float body

The invention claimed is:

1. A method for operating a fuel supply device of a motor vehicle, wherein the fuel supply device comprises:
at least one fuel tank,
at least one fuel delivery pump arranged in the fuel tank inside a surge tank provided therein,
at least a first suction jet pump fed from a feed of the fuel delivery pump for filling the surge tank or for draining at least one second communicating fuel volume arranged or formed inside the fuel tank into the surge tank or into the volume within which the surge tank is arranged,
characterized in that drainage of the second or a further fuel volume with the first suction jet pump or a further suction jet pump takes place only when the tank fill level has fallen below a specific pre-determined level,
characterized in that the first suction jet pump is connected via at least first and second suction lines to the second or further fuel volume to be drained, wherein within a suction path is provided at least one valve which is switchable depending on the fill level and releases one of the suction lines depending on the fill level, and characterized in that the first suction line and the second suction line are openable and closeable with the valve such that, when the first suction line is opened, the second suction line is closed, and, when the first suction line is closed, the second suction line is opened.

2. The method as claimed in claim 1, characterized in that active drainage of the second or a further fuel volume takes place only when the fill level has fallen so far that the volumes of the fuel tank no longer necessarily intercommunicate.

3. A fuel tank for a motor vehicle, comprising:
at least one fuel delivery pump arranged in the fuel tank,
at least a first suction jet pump fed from a feed of the fuel delivery pump, the first suction jet pump arranged for at least one of filling at least one surge tank and for draining at least one further volume arranged inside the fuel tank or formed by the fuel tank into the surge tank or into the volume of the fuel tank in which the surge tank is arranged,
characterized in that the first suction jet pump is connected such that the first suction jet pump takes fuel alternately, depending on the tank fill level, from several volumes arranged or formed inside the fuel tank or that the first suction jet pump is operable intermittently depending on the tank fill level,
characterized in that the first suction jet pump is connected via at least first and second suction lines to the several volumes to be drained, wherein within a suction path is provided a valve which is switchable depending on the fill level and releases one of the suction lines depending on the fill level, and
characterized in that the first suction line and the second suction line are openable and closeable with the valve such that, when the first suction line is opened, the second suction line is closed, and, when the first suction line is closed, the second suction line is opened.

4. The fuel tank as claimed in claim 3, further characterized by a second suction jet pump, also fed from the feed, for draining at least one volume formed inside the fuel tank into the surge tank or into the volume of the fuel tank in which the surge tank is provided.

5. The fuel tank as claimed in claim 3, characterized in that the first suction jet pump is connected to at least one collection tank formed as a fluid trap of a tank ventilation and purging device.

6. The fuel tank as claimed in claim 5, characterized in that the valve is activatable directly or indirectly via at least one fill level sensor arranged inside the collection tank, wherein the collection tank is formed such that, when a fill level of fuel in the fuel tank is low, fuel drains into the fuel tank under gravity activation.

7. The fuel tank as claimed in claim 3, characterized in that the valve is switchable directly or indirectly via at least one fill level sensor arranged inside the fuel tank.

8. The fuel tank as claimed in claim 3, characterized in that the valve can be activated directly via a float arranged inside the fuel tank.

9. The fuel tank as claimed in claim 3, characterized in that the valve can be activated electromagnetically via a fill level signal supplied by at least one fill level sensor.

10. A fuel tank for a motor vehicle, comprising:
at least one fuel delivery pump arranged in the fuel tank,
at least a first suction jet pump fed from a feed of the fuel delivery pump, the first suction jet pump arranged for at least one of filling at least one surge tank and for draining at least one further volume arranged inside the fuel tank or formed by the fuel tank into the surge tank or into the volume of the fuel tank in which the surge tank is arranged,
characterized in that the first suction jet pump is connected such that the first suction jet pump takes fuel alternately, depending on the tank fill level, from several volumes arranged or formed inside the fuel tank or that the first suction jet pump can be operated intermittently depending on the tank fill level,
characterized in that the first suction jet pump is connected to at least one collection tank formed as a fluid trap of a tank ventilation and purging device, and
characterized in that a valve is activatable directly or indirectly via at least one fill level sensor arranged inside the collection tank, wherein the collection tank is formed such that, in the case of a low fill level in the fuel tank, fuel drains into the fuel tank under gravity activation.

* * * * *